United States Patent
Brehm et al.

[11] Patent Number: 5,548,049
[45] Date of Patent: Aug. 20, 1996

[54] COPOLYMERS OF ALLYLIMINODIACETIC ACID WITH UNSATURATED CARBOXYLIC ACIDS AND THEIR USE AS COMPLEXING AGENTS, PEROXIDE STABILIZERS, BUILDERS IN WASHING AND CLEANING PRODUCTS AND DISPERSING AGENTS

[75] Inventors: Helmut Brehm, Krefeld; Kurt Dahmen, Mönchengladbach-Rheydt; Richard Mertens, Krefeld, all of Germany

[73] Assignee: Chemishe Fabrik Stockhausen GmbH, Krefeld, Germany

[21] Appl. No.: 362,435

[22] PCT Filed: Jul. 1, 1993

[86] PCT No.: PCT/EP93/01694

§ 371 Date: Dec. 29, 1994

§ 102(e) Date: Dec. 29, 1994

[87] PCT Pub. No.: WO94/01477

PCT Pub. Date: Jan. 20, 1994

[30] Foreign Application Priority Data

Jul. 3, 1992 [DE] Germany .................. 42 21 863.2

[51] Int. Cl.$^6$ .................................................. C08F 26/00
[52] U.S. Cl. ........................ 526/312; 526/240; 510/361
[58] Field of Search .................................. 526/312, 240

[56] References Cited

U.S. PATENT DOCUMENTS

| | | | |
|---|---|---|---|
| 2,901,495 | 8/1959 | Teeter et al. | 526/312 |
| 3,887,653 | 6/1975 | Konishi et al. | 526/312 |
| 4,058,656 | 11/1977 | Markiewitz et al. | 526/312 |
| 4,868,263 | 9/1989 | Chen et al. | |
| 5,256,315 | 10/1993 | Lockhart et al. | |

FOREIGN PATENT DOCUMENTS 59-142215  8/1984  Japan ..................... 526/312

*Primary Examiner*—Joseph L. Schofer
*Assistant Examiner*—N. Sarofim
*Attorney, Agent, or Firm*—Evenson, McKeown, Edwards & Lenahan

[57] ABSTRACT

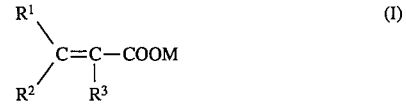

Polymers consisting of (a) 1–50% weight of N-allyliminodiacetic acid and its salts; (b) 50–99% weight of one or several unsaturated, polymerisable carboxylic acids having the formula (I), in which $R^1$ stands for hydrogen, $C_{1-C_4}$ alkyl or COOM, $R^2$ stands for hydrogen or $C_{1-C_4}$ alkyl, $R^3$ stands for hydrogen, $C_{1-C_4}$ alkyl or $CH_2COOM$ and M stands for hydrogen, ammonium, an alkali metal or an alkaline earth metal; and (c) 0–40% by weight water soluble monomers copolymerisable with (a) and (b). These polymers preferably contain acrylic acid, methacrylic acid and maleic acid as unsaturated polymerisable carboxylic acids. Also disclosed are the use of these polymers as complexing agents, as peroxide stabilizers and builders in washing products, as dispersing agents and hardness stabilizers.

14 Claims, No Drawings

COPOLYMERS OF ALLYLIMINODIACETIC ACID WITH UNSATURATED CARBOXYLIC ACIDS AND THEIR USE AS COMPLEXING AGENTS, PEROXIDE STABILIZERS, BUILDERS IN WASHING AND CLEANING PRODUCTS AND DISPERSING AGENTS

In recent years, polymeric carboxylic acids, such as polyacrylic acid, polymethacrylic acid, polyhydroxyacrylic acid, and polymaleic acid, as well as their copolymers have gained great importance in phosphate-reduced and phosphate-free detergents. The advantages of polymer carboxylic acids are based on their good dispersing action of precipitates in the washing liquor, in particular of calcium carbonate and soil particles, and on a good transport capacity of calcium ions from the aqueous washing liquor into the zeolites of the detergents.

However, the complexing properties of polycarboxylic acids to heavy metal ions are absolutely insufficient. Since, however, heavy metal ions of Cu, Fe, and Mn, which are always present in washing liquors, decompose the peroxidic bleaching agents of a detergent, thus not only impairing the washing result, but also causing damage to the textile fabric, detergents must contain effective heavy metal complexing agents to exclude the negative effects of heavy metal ions. Typical heavy metal complexing agents used in phosphate-free detergents are nitrilotriacetate, ethylene diamine tetraacetate, or aminomethylene phosphonic acids.

D'Alelio, Journal of Macromolecular Science-Chemistry, Vol. A6, pp. 513–567 (1972), describes polymers and their metal complexes which are produced by reacting polyglycidyl methacrylate with aminoacetic acid or iminodiacetic acid, respectively.

A great disadvantage of these polymers is the susceptibility to hydrolysis of the methacrylic acid ester group. In particular in alkaline washing liquors and at elevated temperatures the ester group is unstable and saponified rapidly. As a consequence, hydrolysis of these polymers results in a homopolymethacrylic acid which no longer has complexing properties to heavy metal ions.

U.S. Pat. No. 4,868,263 describes copolymers of an α,β-unsaturated monomer for the water treatment, preferably with an acid group and amine-containing allyl ethers as the second monomer which is produced of allyl glycide ether and an amino-functional compound. Monoalkylamines or dialkylamines and aminocarboxylic acids, e.g., N-methylglycine and iminodiacetic acid are used as amino-functional compounds. The monomers based on allyl ethers are monomers which react very slowly in radical polymerization and strongly tend to terminate the chain transfer (cf. Houben-Weyl, Methoden der Organischen Chemie, Vol. 14/1, p. 1145). Owing to these properties, allyl ethers only give polymers having low molecular weights, and the conversion of the allyl ether monomer frequently remains incomplete.

EP 0 437 843 describes copolymers of unsaturated acids and alkenylaminomethylene phosphonic acids as well as their use as complexing agents and as co-builders in detergents.

It was the object of the present-invention to provide polycarboxylic acids which are free of phosphorus, have hydrolytic stability and complexing properties and whose molecular weights can be varied over a wide range.

Thus, the subject matter of the present invention are polymers of a) 1–50%-wt. of N-allyliminodiacetic acid and its salts, b) 50–99%-wt. of one or several unsaturated polymerizable carboxylic acids having the formula (I)

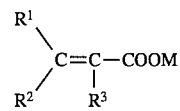

wherein $R^1$= hydrogen, $C_1$–$C_4$ alkyl or —COOM, $R^2$=hydrogen or $C_1$–$C_4$ alkyl, $R^3$=hydrogen, $C_1$–$C_4$ alkyl or $CH_2COOM$, and M=hydrogen, ammonium, an alkali metal or an alkaline-earth metal, and c) 0–40%-wt. of water-soluble monomers copolymerizable with a) and b).

The polymers according to the present invention combine the known properties of two product classes in one polymer. The polymers exhibit the good dispersing properties of the polycarboxylic acids and, at the same time, they complex heavy metal ions to a great extent which is comparable to the classical complexing agents nitrilotriacetate or ethylene diamine tetraacetate. By varying the monomer ratios and the molecular weight polymers having optimized properties can be produced for different applications. The polymers are used in the scale inhibition of saline waters, e.g., in water coolers, or for the dispersion of Ca-carbonate in washing liquors and dyeing baths, or as builder and co-builder in detergents, or as stabilizer for peroxide-containing formulations. The unsaturated, polymerizable carboxylic acids according to b) may, for example, be: (meth)acrylic acid, ethylacrylic acid, butylacrylic acid, 2,2-dimethylacrylic acid, 2-butenoic acid, 2-heptenoic acid, itaconic acid, maleic acid, fumaric acid, or methylmaleic acid. Examples of monomers according to c) include:

2-acrylamido-2-methylpropane sulfonic acid, vinyl sulfonic acid, (meth)allyl sulfonic acid, (meth)acrylamide, N-propyl (meth)acrylamide, 3-di-methylaminopropyl-(meth)acrylamide, hydroxyethyl (meth)acrylate, hydroxypropyl (meth)acrylate, methoxypolyethylene glycol (meth)acrylate, maleic acid semi-ester, maleic acid semi-amides, vinyl pyrrolidone, 3-dimethylaminoethyl (meth)acrylate.

The preferred polymers are made of 10–40%-wt. of N-allyliminodiacetic acid and/or its salts as monomer a), and 60–90%-wt. of at least one unsaturated polymerizable carboxylic acid of the formula I (monomer b) which may also be used in its salt form. If water-soluble monomers c are incorporated by polymerization, their portion amounts to about 10–40%-wt., with a preferred portion of N-allyliminodiacetic acid or its salts of 10–30%-wt. and a preferred portion of unsaturated polymerizable carboxylic acids of formula I of 50–70%-wt., wherein the sum of the three components must always amount to 100.

Most surprisingly it was found that the use of allyliminodiacetic acid results in copolymers whose molecular weights may be varied over a wide range; in addition, the allyliminodiacetic acid may be polymerized to high conversions, i.e., >99%.

The copolymers according to the present invention are manufactured by radical polymerization, preferably in aqueous solution. The polymer concentration amounts to 20–70%. In a preferred production process, to the allyliminodiacetic acid in water, and the comonomers and polymerization catalysts are metered within 1 to 5 hours at 50°–100° C.

The molecular weight of the copolymers can selectively be changed by variation of the catalyst quantity and may amount to between 1,000 and 500,000 g/mole, preferably between 2,000 and 100,000 g/mole.

The present invention further relates to the use of the polymers according to the present invention as complexing agents, peroxide stabilizers and builders in detergents, dispersants and hardness stabilizers.

The present invention will be illustrated in more detail by the following examples.

EXAMPLES

Manufacture of N-allyliminodiacetic acid hydrochloride 57.0 g allyl amine and 150 g water are placed in a flask equipped with stirrer, dropping funnel, thermometer, and pH-electrode and are heated to 60° C. Within 1 hour, 256 g chloroacetate is added in portions, and the pH is maintained at 8–9 by adding 45% sodium hydroxide solution. The temperature amounts to about 60°–65° C. The mixture is allowed to react for 2 hours, then concentrated hydrochloric acid is added until a pH of 1.5 is achieved, followed by cooling and filtration. The filtrate is evaporated to dryness, and the residue is stirred with 900 g glacial acetic acid at 100° C. for 1 hour. Hot filtration is carried out, followed by cooling and severe suction of the precipitate. Finally, washing with acetone and drying is carried out.

| Yield: | 155 g (74%) | | |
|---|---|---|---|
| A.N.: | 14.15 mmol/g | (th: | 14.32) |
| Cl⁻: | 4.80 mmol/g | (th: | 4.77) |
| Double-bond: | 4.77 mmol/g | (th: | 4.77) |

A.N. = Acid number
th = theoretical

Examples 1 to 17

General manufacturing process for the copolymers

Allyliminodiacetic acid hydrochloride is dissolved in water and heated to 80° C. in a flask equipped with stirrer, reflux condenser, and several metering points. Alternatively, the acidified and filtered reaction solution of the preceding production process may also be used. Over a period of 2 hours, the comonomers and catalysts are continuously metered, followed by stirring at 80° C. for another hour. Afterwards, the polymer solution is cooled and neutralized with sodium hydroxide solution to pH 7–8. The content of solid matter is adjusted to 40%.

The composition and the characteristic data of the copolymer solutions are listed in Tables 1 and 2.

The following abbreviations are used:

| | |
|---|---|
| SPS | sodium peroxide sulfate |
| SDS | sodium disulfite |
| AMPS | 2-acrylamidomethylpropane sulfonic acid |
| MAcA | methacrylic acid |
| MA | maleic anhydride |
| AcA | acrylamide |
| HEA | hydroxyethylacrylate |
| DIMAPA | 3-dimethylaminopropyl acrylamide |

In the application tests, a homopolyacrylic acid having a molecular weight of 7,300 g/mole was used as comparison.

TABLE 1

| | Allyl-iminodi-acetic acid (g) | Acrylic acid (g) | SPS (g) | SDS (g) | Viscosity (1) (mPa · s) | MGPC (2) | Residual monomer content of allyliminodiacetic acid (ppm) (3) |
|---|---|---|---|---|---|---|---|
| Polymer 1 | 2 | 80 | 10 | 5 | 600 | 5,100 | 20 |
| Polymer 2 | 10 | 80 | 10 | 5 | 1,000 | 28,700 | 90 |
| Polymer 3 | 20 | 80 | 5 | 2 | 7,700 | 76,000 | 1,800 |
| Polymer 4 | 20 | 80 | 5 | 3.5 | 4,700 | 53,000 | 1,300 |
| Polymer 5 | 20 | 80 | 7.5 | 5 | 1,000 | 24,000 | 560 |
| Polymer 6 | 20 | 80 | 10 | 5 | 450 | 15,000 | 490 |
| Polymer 7 | 20 | 80 | 20 | 10 | 300 | 6,200 | 400 |
| Polymer 8 | 40 | 80 | 10 | 5 | 1,350 | 19,500 | 4,100 |
| Polymer 9 | 60 | 80 | 10 | 5 | 750 | 6,200 | n.d. |

(1) The product viscosity was measured in a Brookfield rotational viscometer (spindle 3/20 rpm) at 25° C.
(2) MGPC is the molecular weight in the peak maximum of the molecular weight determination by means of gel permeation chromatography
(3) determined by means of high pressure liquid chromatography
n.d. = not determined

TABLE 2

| | Allyliminodiacetic acid (g) | Acrylic acid (g) | Comonomer (g) | SPS (g) | SDS (g) | Viscosity (mPa · s) | MGPC |
|---|---|---|---|---|---|---|---|
| Polymer 10 | 20 | 60 | 20 AMPS | 7.5 | 5 | 650 | 10,500 |
| Polymer 11 | 20 | 60 | 40 AMPS | 7.5 | 5 | 950 | |
| Polymer 12 | 20 | 60 | 10 MAcA | 10 | 5 | 570 | |
| Polymer 13 | 20 | 70 | 10 MA | 10 | 5 | 1,000 | 11,300 |
| Polymer 14 | 20 | 60 | 20 MA | 10 | 5 | 320 | |

TABLE 2-continued

|  | Allylimino-diacetic acid (g) | Acrylic acid (g) | Comonomer (g) | SPS (g) | SDS (g) | Viscosity (mPa·s) | MGPC |
|---|---|---|---|---|---|---|---|
| Polymer 15 | 20 | 60 | 20 AcA | 10 | 5 | 5,800 | 7,900 |
| Polymer 16 | 20 | 60 | 20 HEA | 10 | 5 | 1,650 |  |
| Polymer 17 | 20 | 60 | 20 DIMAPA | 10 | 5 | 350 | 8,800 |

Application Tests

1. Determination of the Ca-binding capacity 2.5 g polymer solution with 40% active substance is mixed with 100 g water and adjusted to pH 11 with sodium hydroxide solution. 10 ml 10% soda solution is added thereto, followed by titration with 0.25 molar Ca-acetate solution up to permanent turbidity. (Literature: F. Richter, Tenside Surfactants Detergents 24 (1987) 4, page 215).

|  | Ca-binding capacity mg $CaCO_3$/1 g polymer |
|---|---|
| Polymer 1 | 155 |
| Polymer 2 | 178 |
| Polymer 3 | 188 |
| Polymer 6 | 164 |
| Polymer 7 | 173 |
| Polymer 8 | 167 |
| Polymer 9 | 197 |
| Polymer 14 | 220 |
| Polymer 17 | 138 |
| Homopolyacrylic acid | 145 |

2. Inhibition to Ca-carbonate precipitations

The following test method was used to examine the scale-inhibition and the dispersing power of the polymers.

1.0 to 3.0 g polymer solution with 40% active substance is dissolved in 1 l tap water having 27° dH [German water hardness]. Heating to 80° C. was effected within 20 minutes followed by immediate optical judgment. The lower the quantity used to prevent a precipitation or turbidity, the better the effect of the polymer.

|  | Product concentration g/l |  |  |  |
|---|---|---|---|---|
|  | 1.0 | 1.5 | 2.0 | 3.0 |
| Polymer 1 | opal | slightly opal | clear |  |
| Polymer 2 | opal | opal | clear |  |
| Polymer 6 | opal | slightly opal | clear |  |
| Polymer 7 | opal | slightly opal | clear |  |
| Polymer 8 | opal | slightly opal | clear |  |
| Polymer 9 | opal | opal | clear |  |
| Polymer 14 | opal | opal | clear |  |
| Polymer 17 | clear | — | — |  |
| Homopolyacrylic acid | turbid | turbid | opal | clear |

3. Perborate Stabilization

Hydrogen peroxide and sodium perborate are decomposed catalytically by means of heavy metal ions. This decomposition does not only take place in solutions, but can also occur during the storage of a detergent, reducing the availability of the peroxide to a considerable extent. In the test as to the perborate stabilization, a detergent without phosphate and complexing agents is heated with perborate, copper sulfate, and polymer in solution, and the reduction of the peroxide content in the course of time is observed.

500 ml of an aqueous solution with 1.82 g/l sodium perborate 5.00 g/l detergent 0.14 g/l polymer (active substance), and 1.60 mg/l $CuSO_4$ are heated to 90° C. under standardized conditions within 25 minutes. At the beginning of the heating period, at 70° C. and at 90° C., the peroxide content of the solution is determined iodometrically and given in % residual peroxide.

|  | % Residual peroxide |  |
|---|---|---|
|  | at 70° C. | at 90° C. |
| Polymer 3 | 99 | 82 |
| Polymer 5 |  | 77 |
| Polymer 8 |  | 75 |
| Polymer 9 |  | 78 |
| Polymer 14 | 98 | 72 |
| Polymer 17 | 97 | 78 |
| Homopolyacrylic acid | 31 | <2 |

4. Co-Builder-Effect

The cobuilder effect of the copolymers was determined in practical laundering tests in a Laudner-O-meter. Cotton fabric and a standard soiled fabric (WFK-cotton, 10 C) were washed 5 times at 90° C. for 30 minutes, wherein the standard soiled fabric was replaced by a new piece of fabric after each washing.

The detergent base material had the following composition:

12.7% dodecylbenzene sulfonate 7.3% 10 EO-tallow fatty alcohol 7.2% K-stearate 36.4% perborate 36.4% Wessalith (silicate from Degussa)

The washing liquor comprised 4.3 g/l washing assistant 1.6 mg/l $CuSO_4 \times 5\ H_2O$, and 0.15 g/l of the copolymers according to the present invention (active substance).

After 5 washings the brightening of the test fabrics was determined photometrically by means of an Elrepho-apparatus.

| Brightening | Measured value | % |
|---|---|---|
| without co-builder | 83.1 | — |
| homopolyacrylic acid | 83.6 | 0.6 |
| polymer 3 | 84.4 | 1.6 |
| polymer 6 | 84.8 | 2.0 |
| polymer 8 | 86.3 | 3.8 |

We claim:

1. Polymers of a) 1–50%-wt. of N-allymininodiacetic acid and/or its salts, b) 50–99%-wt. of one or several unsaturated, polymerizable carboxylic acids of the formula I

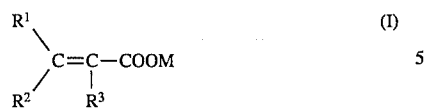 (I)

wherein $R^1$ represents hydrogen, $C_{1-C4}$ alkyl or —COOM, $R^2$ represents hydrogen, or $C_{1-C4}$ alkyl, $R^3$ represents hydrogen, $C_{1-C4}$ alkyl or $CH_2COOM$, and M represents hydrogen, ammonium, an alkali metal or an alkaline earth metal, and c) 0–40%-wt. water-soluble monomers copolymerizable with a) and b)

wherein the polymers have a molecular weight of from about 1,000 to 76,000.

2. The polymers according to claim 1 characterized in that they comprise as unsaturated, polymerizable carboxylic acid of formula I (comonomer b) acrylic acid, methacrylic acid, ethylacrylic acid, butylacrylic acid, 2,2-dimethylacrylic acid, 2-butenoic acid, 2-heptenoic acid, itaconic acid, maleic acid, fumaric acid, methylmaleic acid, or mixtures of these monomers.

3. The polymers according to claim 1 characterized in that they comprise as comonomer c) 2-acrylamido-2-methylpropane sulfonic acid, vinyl sulfonic acid, (meth)allyl sulfonic acid, (meth)acrylamide, N-propyl (meth) acrylamide, hydroxyethyl(meth)acrylate, hydroxypropyl (meth)acrylate, methoxypolyethylene glycol (meth)acrylate, maleic acid semi-esters, maleic acid semi-amides, vinyl pyrrolidone, 3-dimethylaminoethyl (meth)acrylate or mixtures of these comonomers.

4. The polymers according to claim 1 or of 10–40%-wt. of N-allyliminodiacetic acid and/or its salts and 60–90%-wt. of one or several unsaturated, polymerizable carboxylic acids of formula I (comonomer b).

5. The polymers according to claim 1 of 10–30%-wt. of N-allyliminodiacetic acid and/or its salts, and 50–70%-wt. of one or several unsaturated, polymerizable carboxylic acids of formula I (monomer b), and 10–40%-wt. of water-soluble monomers c, wherein the sum of monomers a, b, c must amount to 100.

6. A method of using the polymers according to claim 1, comprising the step of incorporating into a composition selected from the group consisting of detergents, dispersing agents and hardness stabilizers an effective amount of said polymers as complexing agents, peroxide stabilizers or builders.

7. The polymers according to claim 1, wherein the polymers have an effective Ca-binding capacity for incorporation as complexing agents, peroxide stabilizers or builders in detergents, dispersing agents or hardness stabilizers.

8. The polymers according to claim 1, wherein the Ca-binding capacity is from 138 to 220 mg $CaCO_3$/g polymer.

9. The polymers according to claim 1, wherein the Ca-binding capacity at low temperatures is from 138 to 220 mg $CaCO_3$/g polymer.

10. The polymers according to claim 1, wherein the Ca-binding capacity is at least 138 mg $CaCO_3$/g polymer.

11. The polymers according to claim 1, wherein the Ca-binding capacity at low temperatures is at least 138 mg $CaCO_3$/g polymer.

12. Polymers of a) 1–50%-wt. of N-allymininodiacetic acid and/or its salts, b) 50–99%-wt. of one or several unsaturated, polymerizable carboxylic acids of the formula I

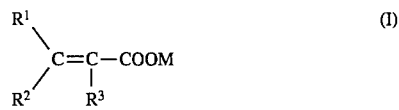 (I)

wherein $R^1$ represents hydrogen, $C_{1-C4}$ alkyl or —COOM, $R^2$ represents hydrogen, or $C_{1-C4}$ alkyl, $R^3$ represents hydrogen, $C_{1-C4}$ alkyl or $CH_2COOM$, and M represents hydrogen, ammonium, an alkali metal or an alkaline earth metal, and c) 0–40%-wt. water-soluble monomers copolymerizable with a) and b)

wherein the polymers have a molecular weight of from 1,000 to 76,000 and a Ca-binding capacity of from 138 to 220 mg $CaCO_3$/g polymer.

13. A process of making the polymers according to claim 1, comprising the step of radical polymerization in an aqueous solution wherein the N-allyliminodiacetic acid, the polymerizable carboxylic acid and the copolymerizable monomer are metered within 1 to 5 hours at 50°–100° C.

14. The process according to claim 13, wherein the N-allyliminodiacetic acid is polymerized to high conversion rates of at least 99%.

* * * * *